March 8, 1932.　　　E. A. ARNDT　　　1,849,046
SIDE EXTENSION RECEPTACLE FOR AUTOMOBILES
Filed Nov. 25, 1929　　　2 Sheets-Sheet 1
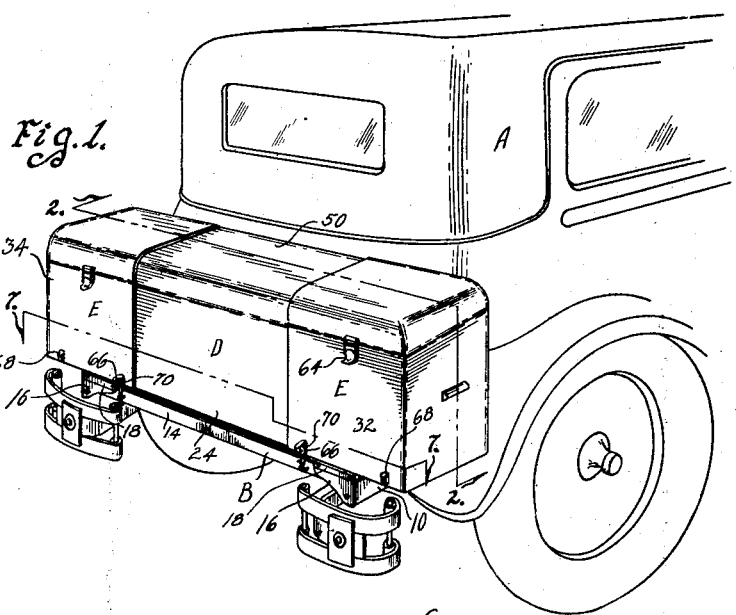
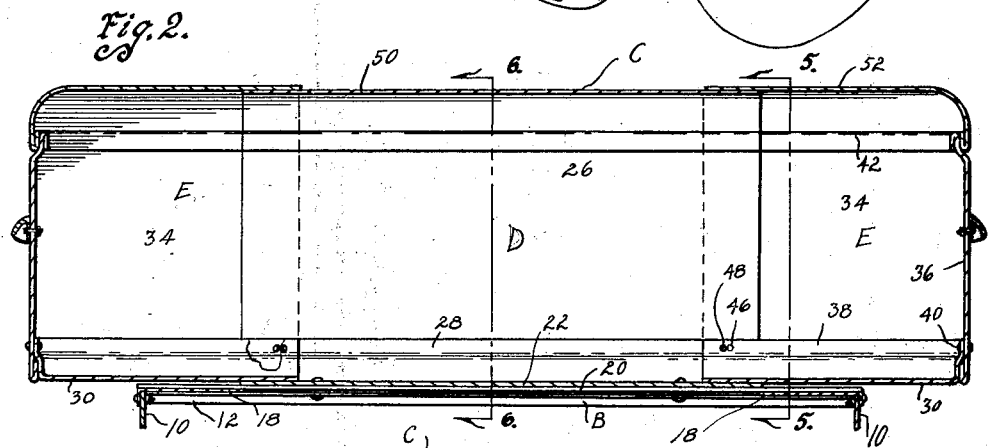
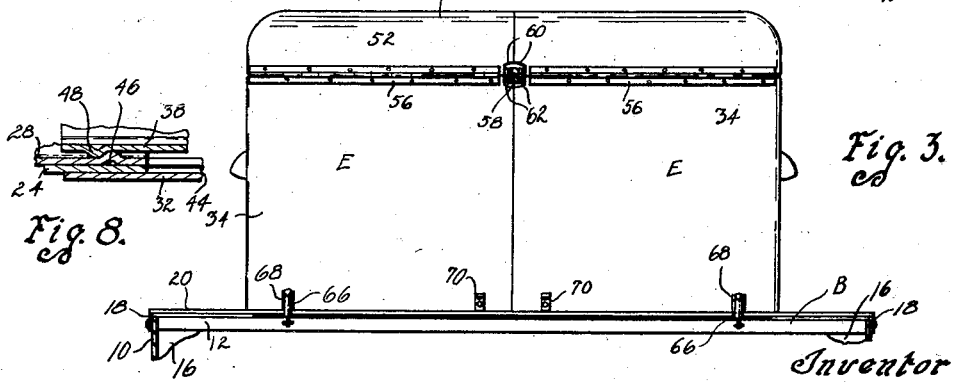
Witness
H. S. Munzenmaier
Inventor
Ernest A. Arndt
by Bair, Freeman & Sinclair
Attorneys

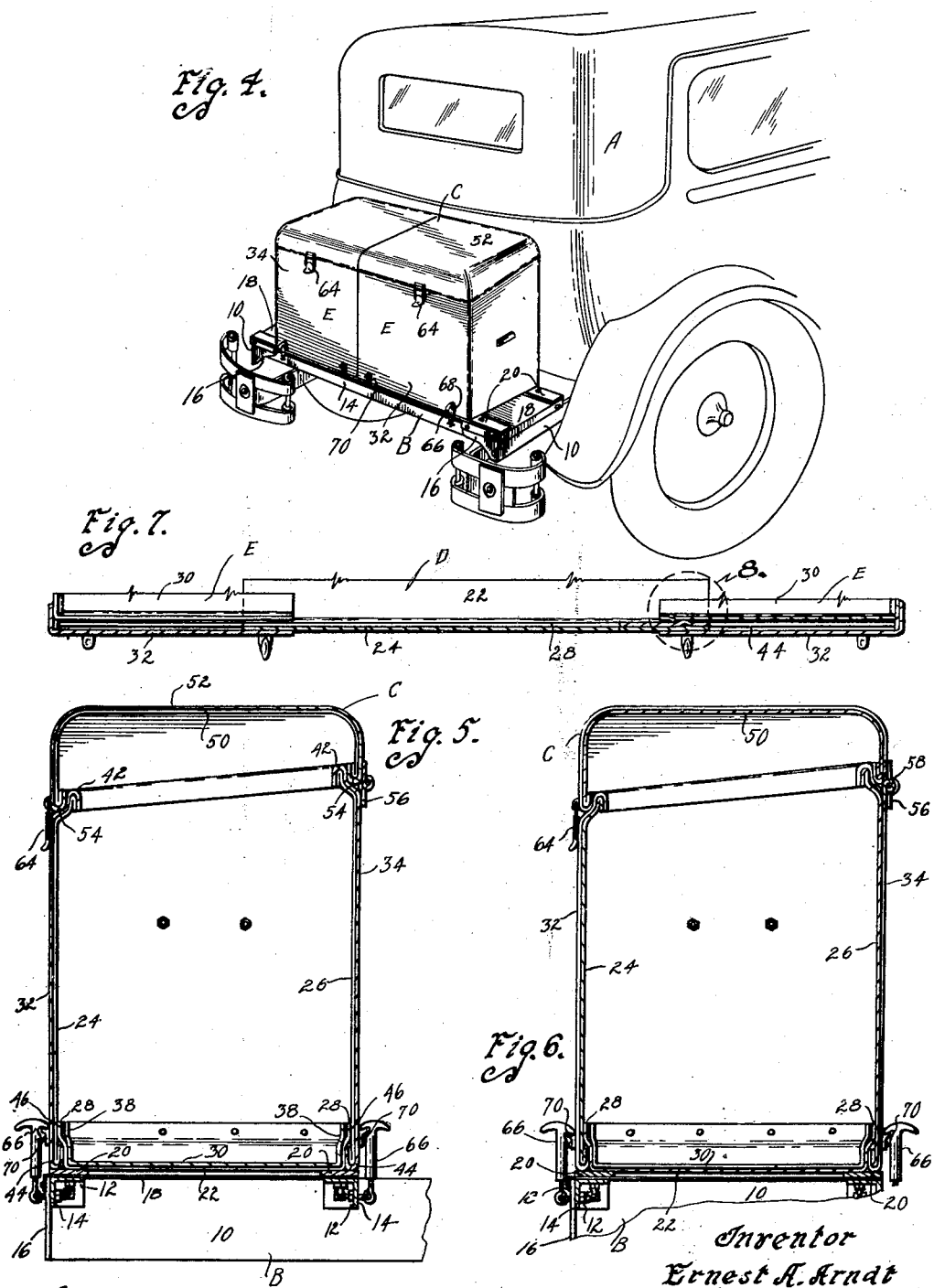

Patented Mar. 8, 1932

1,849,046

UNITED STATES PATENT OFFICE

ERNEST A. ARNDT, OF SIOUX CITY, IOWA, ASSIGNOR, BY MESNE ASSIGNMENTS, TO THE GABRIEL KARI-KEEN COMPANY, A CORPORATION OF DELAWARE

SIDE EXTENSION RECEPTACLE FOR AUTOMOBILES

Application filed November 25, 1929. Serial No. 409,567.

The object of my invention is to provide an extensible receptacle adapted to be mounted on a platform behind an automobile body, the receptacle itself being simple, durable and comparatively inexpensive to manufacture.

A further object is to provide a receptacle of trunk like appearance adapted to contain luggage or other articles, the receptacle being extensible so as to substantially increase its capacity, such extension being in a transverse direction or longitudinally of a transverse supporting platform on which the receptacle is mounted whereby no part of the receptacle extends farther back of the automobile body when extended than when in closed position. In this connection it has heretofore been the practice to build extensible trunks and luggage carriers with the extension feature in a rearward direction. In such construction when luggage is placed in the extended portion of the receptacle, it exerts a leverage action on the rear springs and tires of the automobile which leverage action is entirely absent when extending the receptacle transversely so as not to place the luggage in the extended portion any further behind the automobile body than when the receptacle is closed. In other words the same amount of weight in a side extended receptacle is supported more equally by the front and rear wheels of the automobile than in a rearwardly extended receptacle where the weight exerts a leverage action causing more weight on the rear wheels of the automobile and actually taking some weight off the front wheels, due to a balancing effect with the rear axle as a pivot.

More particularly it is my object to provide an extensible receptacle consisting of a stationary section and a pair of movable sections, the stationary section being secured to the central portion of a transversely arranged platform behind the automobile body and the movable sections being extensible beyond the ends of such platform.

Another object is to provide a novel extensible receptacle construction in which the movable sections are telescopically associated with a stationary section, the sides of the movable sections fitting outside of the sides of the stationary section but the bottoms of the movable sections fitting inside the bottom of the stationary section.

Another object is to provide fastening means between the ends only of the movable sections and their bottoms whereby the movable bottoms may fit inside the stationary bottom while the movable sides fit outside the stationary sides of the receptacle.

Still a further object is to provide connecting means between the front and rear sides of the platform and the movable sections of the extensible receptacle whereby the movable sections may be anchored with respect to the platform when in either closed or extended position.

Another object is to provide a lid for the receptacle consisting of three separate sections telescopically associated with each other, two of the sections being hinged to the movable sections of the receptacle and the third one hinged to the stationary section of the receptacle.

With these and other objects in view my invention consists in the construction, arrangement and combination of the various parts of my device, whereby the objects contemplated are attained, as hereinafter more fully set forth, pointed out in my claims, and illustrated in the accompanying drawings, in which:

Figure 1 is a rear perspective view of an automobile, showing my improved type of side extensible receptacle mounted therebehind and illustrated in extended position.

Figure 2 is an enlarged sectional view on the line 2—2 of Figure 1.

Figure 3 is a rear view of the receptacle when in closed position as viewed from the back of the automobile when looking in a rearward direction.

Figure 4 is a rear perspective view of an automobile, showing the receptacle thereon in closed position.

Figures 5 and 6 are enlarged vertical sectional views on the lines 5—5 and 6—6 of Figure 2.

Figure 7 is a sectional view on the line 7—7 of Figure 1 and

Figure 8 is a detailed sectional view of the portion in the circle 8 of Figure 7, showing the parts enlarged.

On the accompanying drawings I have used the reference character A to indicate generally an automobile. A transversely arranged platform B is mounted stationary with respect to the body of the automobile A and located rearwardly thereof. My improved extensible receptacle C is mounted on and carried by the platform B.

The platform B consists of side plates 10 extending beneath the automobile A and secured to the chassis thereof in any desired or suitable manner. A pair of transversely arranged supporting bars 12 and 14 have their ends secured to the side plates 10. The side plates 10 have right angle extensions 16 at their rearmost ends, secured to the rear face of the supporting bar 14. Sheet metal cover plates 18 are provided on the tops of the ends of the supporting bars 12 and 14 for spanning the space between the side plates 10 and the ends of the receptacle when in closed position, since the receptacle is shorter than the platform B. A pair of slide bars 20 are secured to the supporting bars 12 and 14 over the cover plates 18 for a purpose to hereinafter be fully set forth.

The extensible receptacle C consists of a stationary section D and movable sections E. The stationary section D comprises a bottom 22, a front side 24 and a rear side 26. The bottom 22 has flanges 28 at its front and rear sides which are secured to the front and rear sides 24 and 26 of the stationary section D by spot welding or other suitable means.

Each movable section E of the trunk C comprises a bottom 30, front and rear walls 32 and 34 and an end wall 36. The bottom 30 is provided with front and rear flanges 38 and an end flange 40. The end flange 40 is secured to the end 36 of the movable section E by spot welding or other suitable means. The side flanges 38, however, are not secured to the side walls 32 and 34 but are slightly spaced therefrom.

The sides 32 and 34 of each movable section E are provided along their upper edges with a channel portion 42 to fit over the upper edges of the sides 24 and 26 of the stationary section D. Each lower edge of each side 32 and 34 of the movable sections E is provided with a channel portion 44 to fit over the lower edges of the sides 24 and 26 of the stationary section D. Thus the movable sections E are arranged to telescope relative to the section D and on the outside thereof.

The movable bottom 30, however, is mounted inside the stationary bottom 22 and telescopically arranged relative thereto. It will be noted that the flanges 38 of the bottom 30 of the movable section E are spaced sufficiently far inward of the sides of the movable section to allow for the movable bottom to extend inside of the stationary bottom.

As shown in Figures 7 and 8 the stationary flanges 28 are provided with indentations 46 and the movable flanges 38 are provided with indentations 48 which coact with each other when the movable sections are extended. This is to prevent the movable sections being entirely withdrawn from the stationary section of the receptacle C.

The stationary section D is provided with a cover member 50 and each movable section E is provided with a cover member 52. The cover members 52 are provided with channel portions 54 extending along the edges of the cover member 50 whereby the movable lids 52 may be extended with the movable sections E and yet the entire lid for the receptacle C, consisting of the member 50 and the two members 52, may be raised as a unit.

The lids 52 are provided with hinges 56 whereby they are hinged to the stationary sections E of the receptacle C. The lid 50 of the stationary section is fully supported by the lid members 52 and in order to prevent undesirable longitudinal movement thereof when the sections E are extended, I provide a hinge 58 for hinging the lid 50 to the stationary section D. Notches 60 and 62 are provided in the lid members 52 and the sides 34 of the movable sections E respectively so that such lid members and walls do not interfere with the hinge 58 when the receptacle is in closed position, as best shown in Figure 3. Suitable fastening devices 64 may be provided for holding the lid members 50 and 52 in closed position.

When the movable sections E are extended from the position shown in Figure 3 to the position shown in Figure 2, they are supported by the slide bars 20. Figure 2 actually shows a space between these bars and the movable sections E, but in actual practice this space is negligible as it is merely the thickness of sheet metal and the extensible sections E would actually rest upon the slide bars. If found desirable the slide bars could be made slightly thicker at their ends to eliminate such space. In order to retain the movable sections E in closed position, I provide spring hook members 66 pivoted to the supporting bars 12 and 14 of the platform B. These are similar to the spring hook members used for holding the hoods of radiators in closed position. When the receptacle is in closed position the hook members 66 coact with lugs 68, mounted on the front and rear sides 32 and 34 of the movable sections E. Similar lugs 70 are provided with which the hook members 66 coact when the receptacle is in extended position as shown in Figure 1.

It will be obvious that I have provided an extensible receptacle adapted to be extended for carrying more luggage than is carried in a non-extensible receptacle behind an automobile body, but such additional luggage is not carried farther back of the automobile body when the receptacle is in extended position than when in closed position.

Some changes may be made in the construction and arrangement of the parts of my device without departing from the real spirit and purpose of my invention, and it is my intention to cover by my claims, any modified forms of structure of use of mechanical equivalents, which may be reasonably included within their scope.

I claim as my invention:

1. For use with an automobile body having a transversely arranged platform therebehind, an extensible receptacle comprising a stationary section secured to said platform, a movable section telescopically associated therewith when in one position and forming a continuation thereof longitudinally of said platform when in another position said sections each having a pair of sides and a bottom, the movable section having also an end, the sides of the movable section being arranged outside the sides of the stationary section, the bottom of the movable section being secured to the end thereof and being arranged inside the bottom of the stationary section.

2. In an extensible receptacle construction, a stationary section including a bottom and side walls, a movable section including an end wall, a bottom and side walls, the side walls of said movable section fitting outside of the side walls of said stationary section and the bottom of said movable section being secured to the end wall only thereof and fitting inside of the stationary section.

3. In an extensible receptacle construction, a stationary section, including a bottom and side walls, a movable section including an end wall, a bottom and side walls, the side walls of said movable section fitting outside of the side walls of said stationary section and the bottom of said movable section fitting inside of the stationary section.

4. For use with an automobile body having a transversely arranged platform therebehind, an extensible receptacle comprising a stationary section secured to said platform, a movable section telescopically associated therewith when in one position and forming a continuation thereof longitudinally of said platform when in another position and means on said platform to engage said movable section when in extended or collapsed position.

5. In an extensible receptacle construction, a stationary section including a bottom and side walls, a movable section including an end wall, a bottom and side walls, the side walls of said movable section fitting outside of the side walls of said stationary section and the bottom of said movable section fitting inside of the stationary section whereby the movable section is telescopically arranged relative to the stationary section and means for limiting the telescopic movement of said movable section.

6. For use with an automobile body having a transversely arranged platform therebehind, an extensible receptacle comprising a stationary section secured to said platform, a movable section telescopically associated therewith, said movable section being in register therewith when in one position and forming a continuation thereof longitudinally of said platform when in another position, and retaining means on said platform adapted to coact with the outer and inner portions of the movable section when in collapsed and extended position respectively.

7. In combination with a vehicle having a transversely arranged platform, an extensible receptacle comprising a stationary section of less length than said platform, a pair of endwise extendable movable sections telescopically associated with said stationary section and adapted to be moved to a position overhanging the ends of said platform and means to anchor said movable sections to said platform when they are in extended position.

Des Moines, Iowa, November 4, 1929.

ERNEST A. ARNDT.